United States Patent
Davey et al.

(10) Patent No.: US 6,773,051 B2
(45) Date of Patent: Aug. 10, 2004

(54) SUN VISOR CLIP

(75) Inventors: Geoffrey W. Davey, Huntington Woods, MI (US); Erik R. Davis, Oak Park, MI (US); Steven B. Phillips, Southfield, MI (US); Terry L. Brandl, Marine City, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/116,711

(22) Filed: Apr. 4, 2002

(65) Prior Publication Data

US 2004/0004368 A1 Jan. 8, 2004

Related U.S. Application Data

(60) Provisional application No. 60/281,594, filed on Apr. 4, 2001.

(51) Int. Cl.[7] .................................................. B60J 3/06
(52) U.S. Cl. ........................................ 296/97.7; 24/293
(58) Field of Search ..................... 296/97.7; 24/293, 24/294, 295; 248/27.3

(56) References Cited

U.S. PATENT DOCUMENTS 5,056,853 A * 10/1991 Van Order ................. 296/97.9
6,007,136 A * 12/1999 Zittwitz et al. ............ 296/97.9
6,234,558 B1 * 5/2001 Curtindale .................. 296/97.9
6,669,263 B2 * 12/2003 Asai .......................... 296/97.9

* cited by examiner

Primary Examiner—Joseph D. Pape
(74) Attorney, Agent, or Firm—Clark Hill PLC

(57) ABSTRACT

A sun visor clip for aligning and attaching a sun visor to a headliner of a motor vehicle. The sun visor has a mounting bezel including a tubular center bearing and a plurality of longitudinal grooves formed in the tubular center bearing. The headliner includes a visor opening, a recessed portion surrounding the visor opening, and a plurality of depressions spaced about the recessed portion. The sun visor clip includes a base defining a plane and having an outer peripheral edge and an inner peripheral edge defining a center aperture. The sun visor clip also includes a plurality of alignment tabs projecting radially from the outer peripheral edge for cooperation with the depressions in the headliner to align the sun visor clip within the recessed portion of the headliner. In addition, the sun visor clip includes a plurality of guide tabs projecting radially inwardly from the inner peripheral edge for aligning each of the plurality of longitudinal grooves in the tubular center bearing whereby the sun visor clip aligns the mounting bezel with the headliner upon receipt of the tubular center bearing through the visor opening and the center aperture of the sun visor clip.

25 Claims, 4 Drawing Sheets

SUN VISOR CLIP

This application claims the benefit of provisional Application No. 60/281,594 filed Apr. 4, 2001.

BACKGROUND OF THE INVENTION

1. Field of the Invention

This invention relates to a sun visor clip for a motor vehicle. More specifically, the invention relates to a sun visor clip that secures and aligns a sun visor to a headliner of a motor vehicle.

2. Description of Related Art

Traditionally, motor vehicle interior components, such as sun visors, were attached to a roof panel of a motor vehicle by screws or Christmas tree type fasteners. Individual installation of screws, however, is both time-consuming and costly. In addition, screws are not aesthetically pleasing to the occupants of a motor vehicle passenger compartment. At the same time, Christmas tree type fasteners are easier to install but have the drawback of being either difficult to remove or, even if removable, not reusable.

The recent trend in the design and assembly of interior components has been to utilize modular snap together parts that may be pre-assembled prior to shipment and final assembly into the motor vehicle. For example, sun visors are commonly pre-assembled to the headliner of the motor vehicle by sandwiching the headliner between the sun visor and a sun visor clip. The sun visor clip may be screwed to a mounting bezel of the sun visor prior to assembly of the headliner and the sun visor to the motor vehicle. However, proper alignment of the sun visor clip to both the mounting bezel of the sun visor and to the headliner has been difficult to achieve.

U.S. Pat. No. 6,007,136 discloses a modular sun visor attachment fastener. The fastener defines a base and spring biased legs that the visor assembly to the frame of the motor vehicle. While this device secures the visor assembly to the motor vehicle in the proper position, the fastener lacks any ability to control its orientation and position with respect to the headliner during the overall installation of the headliner and the visor assembly to the motor vehicle. This design is deficient because the visor assemblies that are installed using this fastener must be realigned as the headliner is being installed into the motor vehicle.

SUMMARY OF THE INVENTION

A sun visor clip is provided for aligning and attaching a sun visor to a headliner of a motor vehicle. The sun visor has a mounting bezel including a tubular center bearing and a plurality of longitudinal grooves formed in the tubular center bearing. The headliner has a visor opening, a recessed portion surrounding the visor opening, and a plurality of depressions spaced about the recessed portion. The sun visor clip includes a base defining a plane and having an outer peripheral edge and an inner peripheral edge defining a center aperture. The sun visor clip also includes a plurality of alignment tabs projecting radially from the outer peripheral edge for cooperation with the plurality of depressions in the headliner to align the sun visor clip within the recessed portion of the headliner in a specific orientation.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
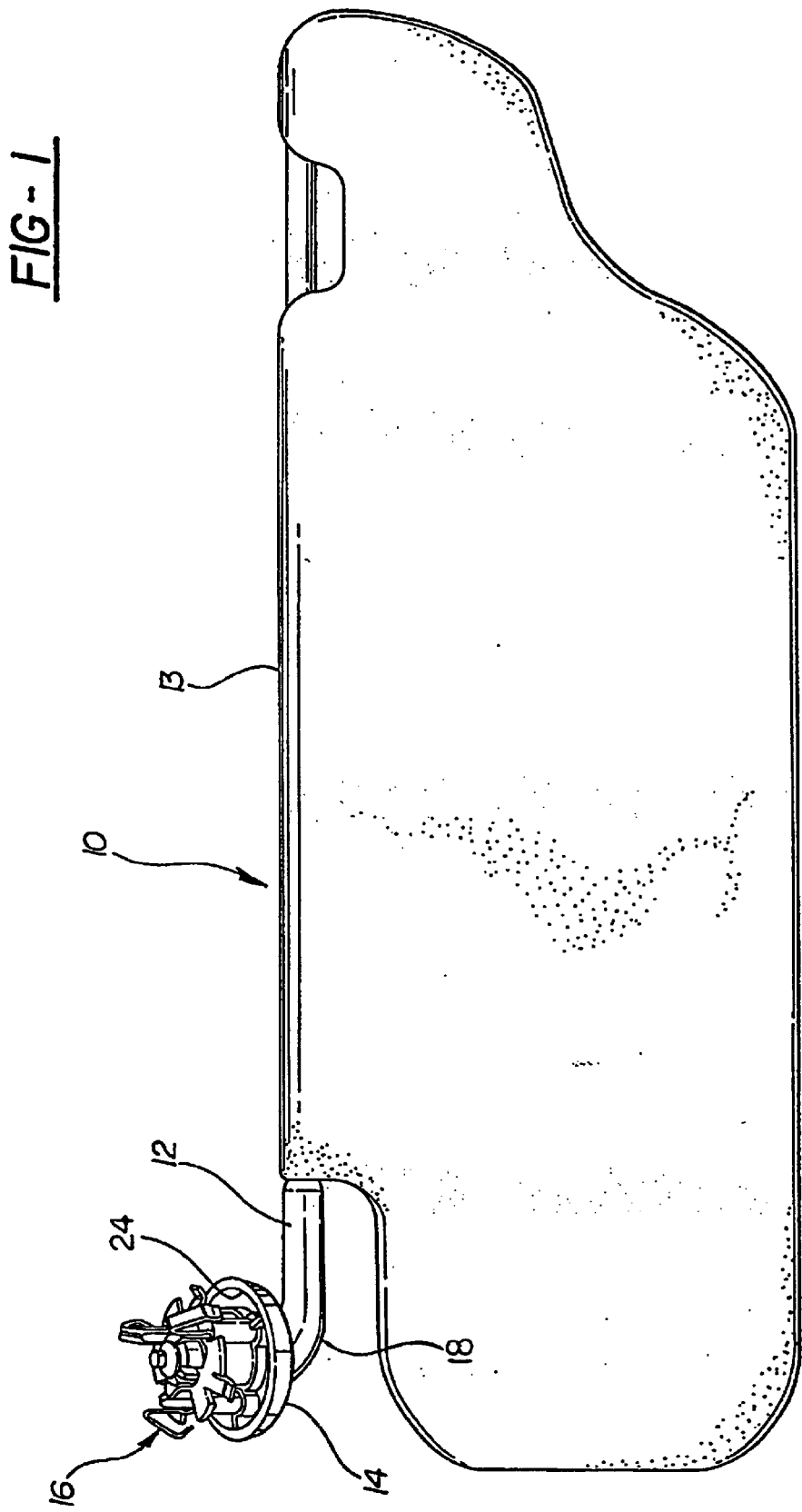
FIG. 1 is a perspective view of a sun visor assembly and a sun visor clip of one embodiment of the invention.

Referring to the Figures, a sun visor assembly, generally shown at 10, includes an extending arm 12, a sun visor 13 and a mounting bezel 14 supported by the extending arm 12. A sun visor clip, generally shown at 16, aligns and engages the sun visor assembly 10.

The sun visor 13 pivots about an axis defined by the extending arm 12 allowing the user thereof to selectively use the sun visor 13 to block undesired light, typically from the sun, from detracting from the user's ability to see. The extending arm 12 includes a bend 18 so that a mounting end thereof, not shown but secured within a tubular center bearing 20, may be mounted to a headliner 22 of a motor vehicle (not shown) above a windshield or window and still have the sun visor 13 pivot about an axis generally parallel to the windshield or window.

The mounting bezel 14 extends over the extending arm 12 between the bend 18 and the tubular center bearing 20. The mounting bezel 14 has an outer lip 24 and defines an inner diameter. The mounting bezel 14 holds the sun visor assembly 10 to a roof 26 of the motor vehicle and covers the connection therebetween. The mounting bezel 14 includes a cover 28 that extends between the outer lip 24 and the inner diameter. The mounting bezel also includes a base portion 30 that extends upwardly from the cover 28 in the same direction as the outer lip 24. More specifically, the outer lip 24 and base portion 30 extend away from the cover 28 generally perpendicularly thereto.

The base portion 30 includes a plurality of screw bosses 32 that receive screws 34 therein. The screws 34 secure the sun visor assembly 10 to the roof 26. The securing of the sun visor assembly 10 is performed after the sun visor assembly 10 is positioned, aligned and secured to the headliner 22.

Returning attention to the tubular center bearing 20, an outer wall 36 is defined thereby. Longitudinal grooves 38 are cut through the outer wall 36. The longitudinal grooves 38 extend into the tubular center bearing 20 but do not extend all the way therethrough. A set of slots 40 are cut through the tubular center bearing 20 at locations equally spaced along the outer wall 36. The set of slots 40 provide a designed flex in the tubular center bearing 20 allowing the tubular center bearing 20 to receive and lockingly engage the extending arm 12. The longitudinal grooves 38 will be discussed in greater detail subsequently.

Figure 2:
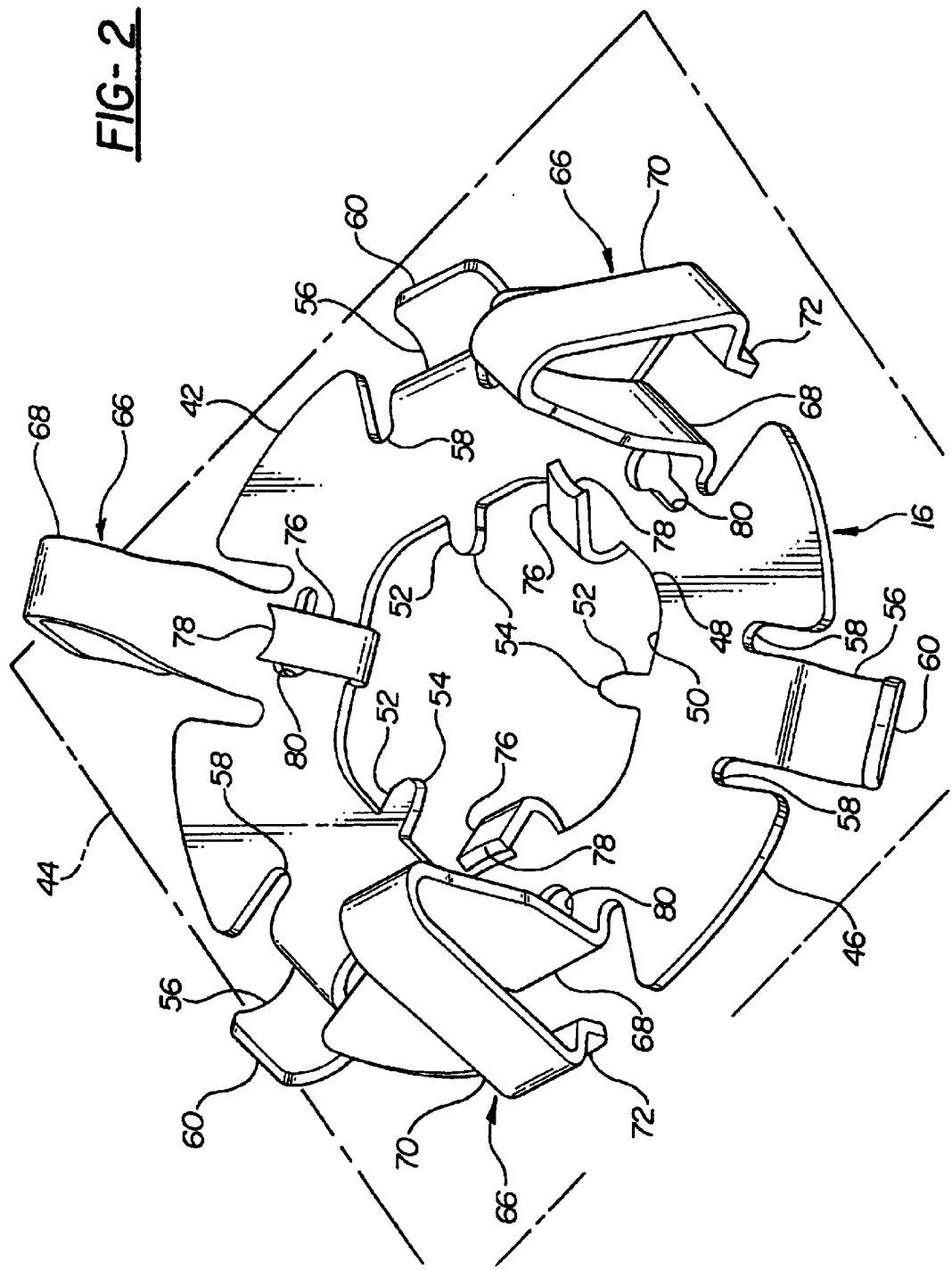
FIG. 2 is a perspective view of a sun visor clip of one embodiment of the invention.
Figure 3:
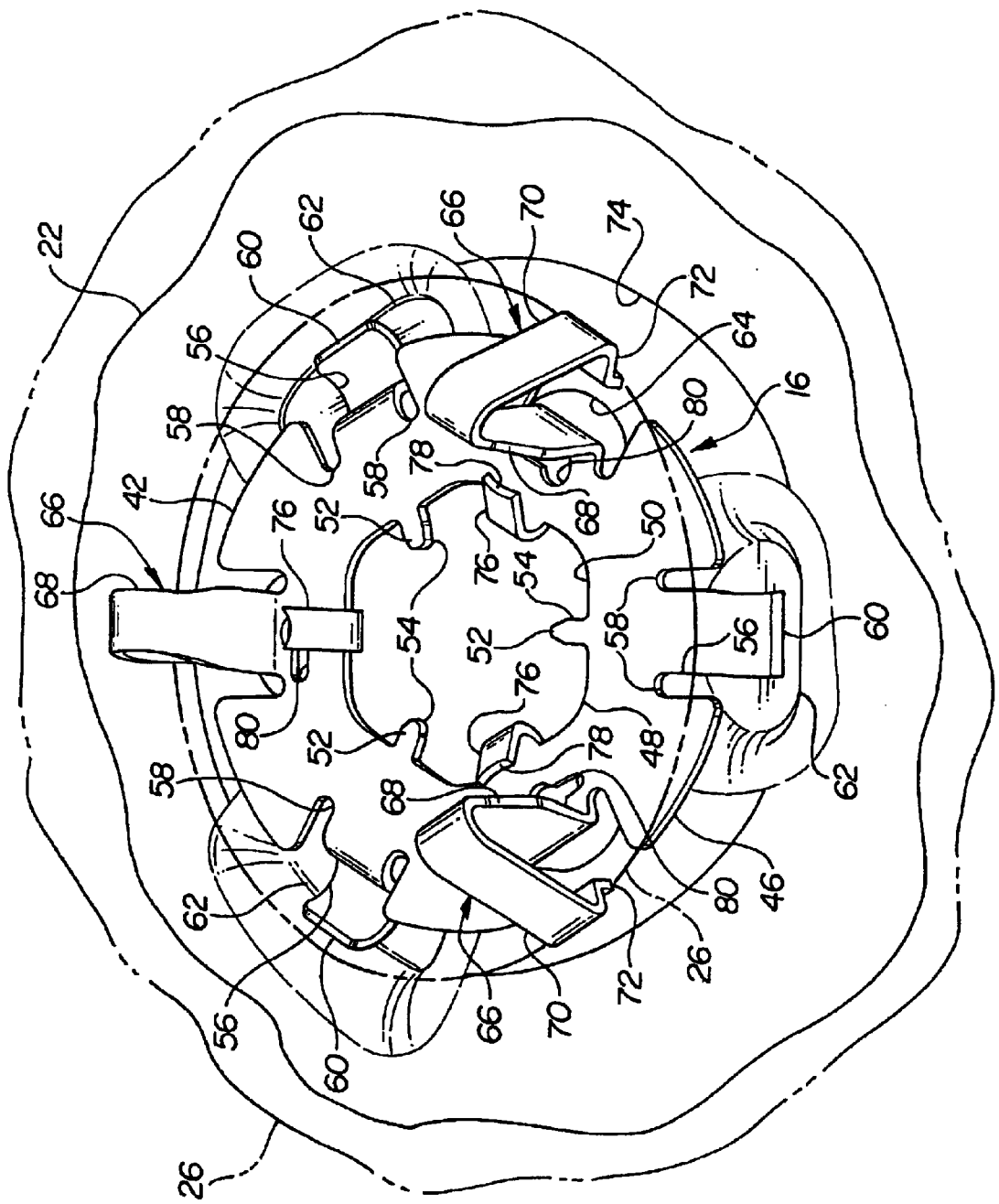
FIG. 3 is a perspective view of the sun visor clip of one embodiment of the invention aligned with a headliner, partially cut away, of a motor vehicle.

Referring to FIG. 2, the sun visor clip 16 includes a base 42. In a preferred design, the base 42 is annular in shape. The base 42 extends through a plane 44 and includes an outer peripheral edge 46 and an inner peripheral edge 48. The inner peripheral edge 48 of the base 42 further defines a center aperture 50. In the preferred embodiment, the center aperture 50 is hexagonal in shaped.

The sun visor clip 16 includes a plurality of guide tabs 52 projecting radially inwardly from the inner peripheral edge 48. The hexagonal shaped center aperture 50 allows the guide tabs 52 to be shorter in length and stronger. The guide tabs 52 are tapered at distal ends 54 thereof. The guide tabs 52 extend out of the plane 44 defined by the base 42. The guide tabs 52 coact with tubular center bearing 20 to guide the tubular center bearing 20 through the center aperture 50 of the sun visor clip 16. More specifically, the guide tabs 52 engage the longitudinal grooves 38 in the tubular center bearing 20 to prevent the tubular center bearing 20 from rotating with respect to the sun visor clip 16. The guide tabs 52 have a predetermined length that are designed to frictionally engage the tubular center bearing 20 to temporarily hold it in place until the screws 34 can be installed. To facilitate the proper orientation and alignment of the tubular center bearing 20 as it is inserted into the sun visor clip 16, the guide tabs 52 are designed to extend out of the plane 44 defined by the base 42. The guide tabs 52 are bent in the same direction as the direction the tubular center bearing 20 passes through the sun visor clip 16 when being installed.

The sun visor clip 16 additionally includes a plurality of alignment tabs 56 that project radially from the outer peripheral edge 46 of the base 42. The plurality of alignment tabs 56 partially cut out of the base 42. Base slots 58 on either side of each of the alignment tabs 56 provide the alignment tabs 56 with a desired length without increasing the overall size of the sun visor clip 16 to a size that exceeds the diameter of the outer lip 24 of the mounting bezel 14.

Each of the plurality of alignment tabs 56 defines a tab end 60. The alignment tabs 56 are designed to extend out of the plane 44 between the tab ends 60 and the base 42 in a direction opposite that of the direction in which the guide tabs 52 extend. In the preferred embodiment, the alignment tabs 56 define a path that is C-shaped in cross section. It should be appreciated by those skilled in the art that the path through which the alignment tabs 56 extend may vary, but the path must include a component that extends below the plane 44 when viewing the sun visor clip 16 as is shown in FIG. 2.

Each of the plurality of alignment tabs 56 is aligned radially with the adjacent guide tab 52 on the inner peripheral edge 48 of the center aperture 50. The radial alignment of the alignment tabs 56 and the guide tabs 52 eliminates any requirement to identify the individual guide tabs 52 to properly align the sun visor clip 16 with respect to the tubular center bearing 20. In this respect, the sun visor clip 16 is universal.

Each of the plurality of alignment tabs 56 is received by and cooperates with one of a plurality of depressions 62 in the headliner 22. The plurality of depressions 62 are spaced about a visor opening 64 therein designed to receive the tubular center bearing 20 therethrough. The alignment tabs 56 cooperate with the depressions 62 to prevent the sun visor clip 16 from rotating with respect to the headliner 22 as the sun visor assembly 10 is being installed. Therefore, the alignment tabs 56 ensure the sun visor clip 16 is in a specific orientation with respect to the headliner 22.

The base 42 further includes plurality of snap legs, generally shown at 66, projecting outwardly from the outer peripheral edge 46 thereof. Each of the plurality of snap legs 66 includes an upwardly extending base portion 68 and a downwardly extending spring bias leg portion 70. The spring bias leg portion 70 defines an end 72. The end 72 of the spring bias leg portion 70 is preferably L-shaped. The snap legs 66 engage a recessed portion 74 of the headliner 22 and the roof 26. The snap legs 66 secure the sun visor assembly 10 to the roof 26 of the motor vehicle.

Figure 4:
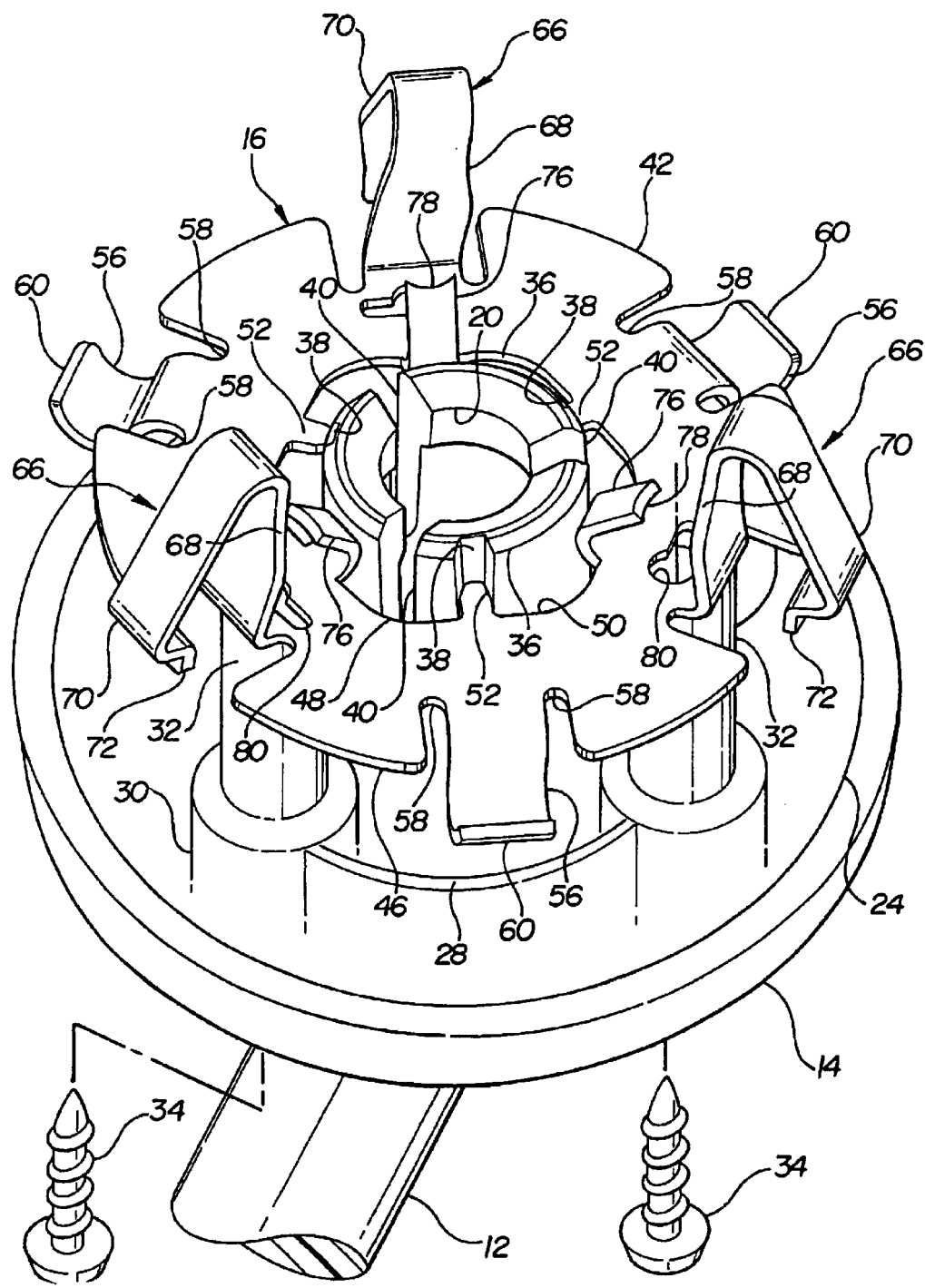
FIG. 4 is an exploded, perspective view of the sun visor clip of one embodiment of the invention aligned with a mounting bezel of a sun visor, partially cut away.

A plurality of screw retainers 76 extends upwardly from the inner peripheral edge 48. Each of the plurality of screw retainers 76 projects upwardly to a distal end 78. Each of the distal ends 78 is preferably curved to threadingly engage each of the plurality of screws 34 (as shown in FIG. 4) thereagainst. In addition, the base 42 defines a plurality of screw apertures 80 extending therethrough. Each of the plurality of screw apertures 80 is aligned vertically with each of the plurality of screw retainers 76 for receiving one of the plurality of screws 34 therethrough. Each of the plurality of screw apertures 80 is keyhole shaped.

In assembly, with the sun visor clip 16 aligned with the mounting bezel 14 of the sun visor assembly 10, the sun visor assembly 10 is secured to the headliner 22. For proper alignment of the sun visor clip 16 to the mounting bezel 14 of the sun visor assembly 10, the tubular center bearing 20 of the mounting bezel 14 must first be aligned with the center aperture 50 of the sun visor clip 16. Each of the plurality of guide tabs 52 must then be radially aligned with each of the plurality of longitudinal grooves 38 in the tubular center bearing 20. To ensure such alignment, each of the plurality of guide tabs 52 extends inwardly to the predetermined distance to engage each of the plurality of longitudinal grooves 38. The guide tabs 52 are tapered, or pointed, and angled slightly upwardly such that there is a tight friction fit between the guide tabs 52 and the longitudinal grooves 38 to retain the sun visor clip 16 on the mounting bezel 14 of the sun visor assembly 10. After alignment of the extending arm 12 and the sun visor clip 16, the extending arm 12 and sun visor clip 16 are together brought to the headliner 22 for engagement thereto. The mounting bezel 14 of the sun visor assembly 10 is extended through the visor opening 64 of the headliner 22 until the alignment tabs 56 engage the depressions 62 spaced about the recessed portion 74 of the headliner 22. As a result, the headliner 22 is sandwiched between the sun visor clip 16 and the base portion 30 of the mounting bezel 14. The screws 34 are then screwed into the sun visor clip 16 via the screw bosses 32 and retained therein by the screw retainers 76. The screws 34 provide the permanent attachment of the sun visor clip 16 to the mounting bezel 14. The screws 34 eliminate the need for the guide tabs 52 to be anything more than a temporary securing device during the assembly of the sun visor assembly 10. The snap legs 66, extending outwardly from the outer peripheral edge 46 are aligned with and received through openings in a roof 26 such that the leg end 72 of the spring bias leg portion 70 locks the sun visor clip 16 to the roof 26 and, thus, secures the headliner 22 and the mounting bezel 14 of the sun visor assembly 10 to the motor vehicle.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A sun visor clip for aligning and attaching a sun visor having a mounting bezel, including a tubular center bearing and a plurality of longitudinal grooves formed in the tubular center bearing, to a headliner of a motor vehicle having a visor opening, a recessed portion surrounding the visor opening, and a plurality of depressions spaced about the recessed portion, said sun visor clip comprising:

a base defining a plane and having an outer peripheral edge and an inner peripheral edge defining a center aperture;

a plurality of snap legs projecting outwardly from said outer peripheral edge of said base; and a plurality of alignment tabs projecting radially from said outer peripheral edge cooperating with the plurality of depressions in the headliner to align said sun visor clip within the recessed portion of the headliner in a specific orientation.

2. A sun visor clip as set forth in claim 1 including a plurality of guide tabs projecting radially inwardly from said inner peripheral edge, each of said plurality of guide tabs coacting with each of the plurality of longitudinal grooves in the tubular center bearing so that said sun visor clip guides the tubular center bearing when the tubular center bearing passes through the visor opening and said center aperture of said sun visor clip.

3. A sun visor clip as set forth in claim 2 wherein each of said plurality of guide tabs extends inwardly a predetermined distance to engage each of said plurality of longitudinal grooves securing the headliner between the mounting bezel and said sun visor clip.

4. A sun visor clip as set forth in claim 3 wherein each of said plurality of alignment tabs extends out of said plane defined by said base such that each of said plurality of alignment tabs extends into each of the plurality of depressions in the headliner.

5. A sun visor clip as set forth in claim 4 wherein each of said plurality of snap legs includes an upwardly extending base portion and a downwardly extending spring bias leg portion.

6. A sun visor clip as set forth in claim 5 wherein said spring bias leg portion defines an end for retaining said sun visor clip against the recessed portion of the headliner.

7. A sun visor clip as set forth in claim 6 wherein said base includes a plurality of upwardly extending screw retainers having a distal end for threadingly engaging a plurality of screws so that each of said plurality of screws tightens said sun visor clip against the mounting bezel.

8. A sun visor clip as set forth in claim 7 wherein said base defines a plurality of screw apertures extending therethrough, each of said plurality of screw apertures being aligned vertically with said distal ends of each of said plurality of screw retainers for receiving one of said plurality of screws therethrough.

9. A sun visor clip as set forth in claim 8 wherein each of said plurality of guide tabs is tapered.

10. A sun visor clip as set forth in claim 9 wherein each of said plurality of guide tabs extends out of said plane defined by said base.

11. A sun visor clip as set forth in claim 10 wherein each of said plurality of screw apertures defines a keyhole shaped.

12. A sun visor clip as set forth in claim 11 wherein said spring bias leg portion defines an L-shaped end.

13. A sun visor clip as set forth in claim 12 wherein each of said distal ends of each of said plurality of upwardly extending screw retainers is curved to receive each of said plurality of screws thereagainst.

14. A sun visor clip for aligning and attaching a sun visor having a mounting bezel, including a tubular center bearing and a plurality of longitudinal grooves formed in the tubular center bearing, to a headliner of a motor vehicle having a visor opening, a recessed portion surrounding the visor opening, and a plurality of depressions spaced about the recessed portion, said sun visor clip comprising:

a base defining a plane and having an outer peripheral edge and an inner peripheral edge defining a center aperture;

a plurality of snap legs projecting outwardly from said outer peripheral edge of said base; and a plurality of guide tabs projecting radially inwardly from said inner peripheral edge, each of said plurality of guide tabs coacting with each of the plurality of longitudinal grooves in the tubular center bearing so that said sun visor clip guides the mounting bezel with the headliner when the tubular center bearing passes through the visor opening and said center aperture of said sun visor clip.

15. A sun visor clip as set forth in claim 14 wherein each of said plurality of guide tabs extends inwardly a predetermined distance to engage each of said plurality of longitudinal grooves securing the headliner between the mounting bezel and said sun visor clip.

16. A sun visor assembly as set forth in claim 14 wherein each of said plurality of snap legs includes an upwardly extending base portion and a downwardly extending spring bias leg portion.

17. A sun visor assembly as set forth in claim 16 wherein said spring bias leg portion defines an end for retaining said sun visor clip against said recessed portion of said headliner.

18. A sun visor assembly as set forth in claim 17 wherein said base includes a plurality of upwardly extending screw retainers having a distal end for threadingly engaging a plurality of screws so that each of said plurality of screws tightens said sun visor clip against said mounting bezel.

19. A sun visor assembly as set forth in claim 18 wherein said base defines a plurality of screw apertures extending therethrough, each of said plurality of screw apertures being aligned vertically with said distal ends of each of said plurality of screw retainers for receiving one of said plurality of screws therethrough.

20. A sun visor assembly as set forth in claim 19 wherein each of said plurality of guide tabs is tapered.

21. A sun visor assembly as set forth in claim 20 wherein each of said plurality of guide tabs extends out of said plane defined by said base.

22. A sun visor assembly as set forth in claim 21 wherein each of said plurality of screw apertures defines a keyhole shaped.

23. A sun visor assembly as set forth in claim 22 wherein said spring bias leg portion defines an L-shaped end.

24. A sun visor assembly as set forth in claim 23 wherein each of said distal ends of each of said plurality of upwardly extending screw retainers is curved to receive each of said plurality of screws thereagainst.

25. A sun visor clip for aligning and attaching a sun visor having a mounting bezel, including a tubular center bearing and a plurality of longitudinal grooves formed in the tubular center bearing, to a headliner of a motor vehicle having a visor opening, a recessed portion surrounding the visor opening, and a plurality of depressions spaced about the recessed portion, said sun visor clip comprising:

a base defining a plane and having an outer peripheral edge and an inner peripheral edge defining a center aperture;

a plurality of guide tabs projecting radially inwardly from said inner peripheral edge, each of said plurality of guide tabs coacting with each of the plurality of longitudinal grooves in the tubular center bearing so that said sun visor clip guides the mounting bezel with the headliner when the tubular center bearing passes through the visor opening and said center aperture of said sun visor clip; and a plurality of alignment tabs projecting radially from said outer peripheral edge cooperating with the plurality of depressions in the headliner to align said sun visor clip within the recessed portion of the headliner in a specific orientation.

* * * * *